(12) United States Patent  
Glennon et al.

(10) Patent No.: US 10,313,697 B2  
(45) Date of Patent: Jun. 4, 2019

(54) VIDEO COMPRESSION SYSTEMS AND METHODS

(71) Applicant: Cable Television Laboratories, Inc., Louisville, CO (US)

(72) Inventors: Stephen G. Glennon, Lafayette, CO (US); Arianne T. Hinds, Louisville, CO (US); Gregory Rutz, Arvada, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 568 days.

(21) Appl. No.: 14/682,467

(22) Filed: Apr. 9, 2015

(65) Prior Publication Data

US 2016/0301944 A1  Oct. 13, 2016

(51) Int. Cl.
| | |
|---|---|
| *H04N 7/12* | (2006.01) |
| *H04N 19/44* | (2014.01) |
| *H04N 19/46* | (2014.01) |
| *H04N 19/61* | (2014.01) |
| *H04N 19/33* | (2014.01) |
| *H04N 19/31* | (2014.01) |

(52) U.S. Cl.
CPC .............. *H04N 19/46* (2014.11); *H04N 19/31* (2014.11); *H04N 19/33* (2014.11); *H04N 19/61* (2014.11)

(58) Field of Classification Search
None
See application file for complete search history.

(56) References Cited

U.S. PATENT DOCUMENTS

| | | | | | |
|---|---|---|---|---|---|
| 6,101,276 | A | * | 8/2000 | Adiletta | H04N 19/159 375/E7.093 |
| 2007/0058716 | A1 | * | 3/2007 | Blum | H04N 19/15 375/240.03 |

* cited by examiner

*Primary Examiner* — Sathyanaraya V Perungavoor  
*Assistant Examiner* — Patricia I Young

(57) ABSTRACT

Systems and methods presented herein provide for video compression and decompression. In one embodiment, a video compression system includes a decimation filter operable to receive a video datastream, and to filter the video datastream to remove spatial data components and temporal data components of the video datastream. The system also includes a video codec operable to compress the filtered video datastream and a comparator operable to compare the video datastream to the filtered-compressed video datastream, and to determine a difference video datastream based on the comparison. The system also includes a generator operable to generate a tool for decompressing the filtered-compressed video datastream based on the difference video datastream.

10 Claims, 6 Drawing Sheets

VIDEO COMPRESSION SYSTEMS AND METHODS

BACKGROUND

Video compression reduces bandwidth of a video datastream as well as a storage footprint of video data by reducing redundancy in the video data. Video compression generally employs spatial image compression and temporal motion compensation. But, most video compression techniques are "lossy". For example, video data may be represented as a series of still image frames. The sequence of frames contains spatial and temporal redundancy that video compression algorithms attempt to eliminate or encode in a smaller size. Similarities can be encoded by storing differences between frames and/or by using known perceptual features of human vision. But, there is still a loss of data during this process that makes accurate representation of the video data after decompression less likely.

SUMMARY

Systems and methods presented herein provide for video compression and decompression. In one embodiment, a video compression system includes a decimation filter operable to receive a video datastream, and to filter the video datastream to remove spatial data components and temporal data components of the video datastream. The system also includes a video codec operable to compress the filtered video datastream and a comparator operable to compare the video datastream to the filtered-compressed video datastream, and to determine a difference video datastream based on the comparison. The system also includes a generator operable to generate data for decompressing (e.g., a decompression tool) the filtered-compressed video datastream based on the difference video datastream.

The various embodiments disclosed herein may be implemented in a variety of ways as a matter of design choice. For example, some embodiments herein are implemented in hardware whereas other embodiments may include processes that are operable to implement and/or operate the hardware. Other exemplary embodiments, including software and firmware, are described below.

BRIEF DESCRIPTION OF THE FIGURES

Some embodiments of the present invention are now described, by way of example only, and with reference to the accompanying drawings. The same reference number represents the same element or the same type of element on all drawings.

DETAILED DESCRIPTION OF THE FIGURES

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention and are to be construed as being without limitation to such specifically recited examples and conditions. As a result, the invention is not limited to the specific embodiments or examples described below.

Figure 1:
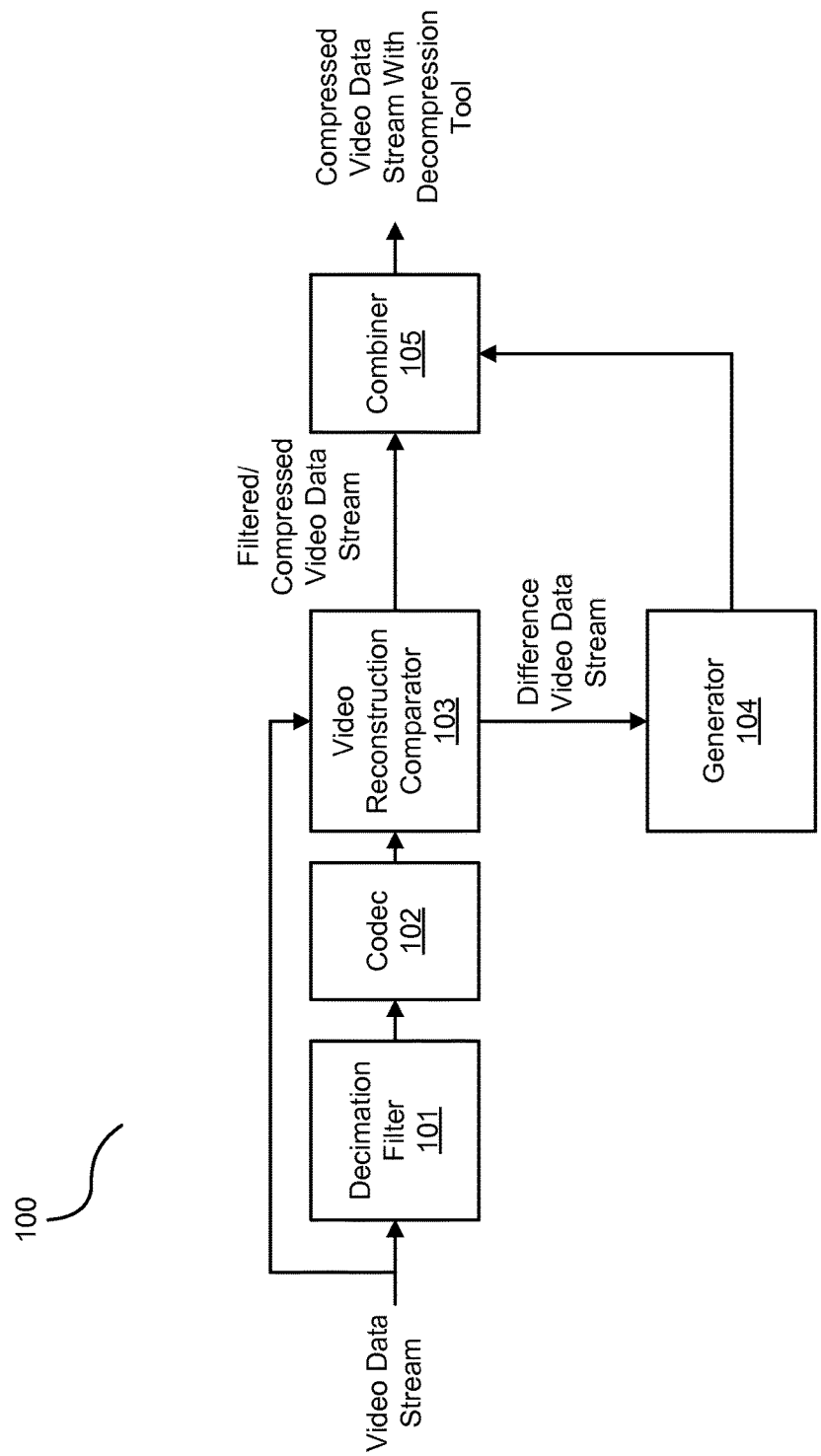
FIG. 1 is a block diagram of an exemplary video compression system.

FIG. 1 is a block diagram of an exemplary video compression system 100. The video compression system 100 is operable to receive a video datastream and compress it for transmission utilizing a smaller bandwidth. Alternatively or additionally, the video compression system 100 may be operable to compress the video datastream for storage with less requisite storage space. In this embodiment, the video compression system 100 employs a decimation filter 101, a video codec (coder/decoder) 102, and a video reconstruction comparator 103.

The decimation filter 101 first removes a portion of the spatial and/or temporal components of the video datastream. For example, the decimation filter 101 may apply interlacing techniques such as "checkerboard" or "quincunx" to the video datastream to remove spatial components from the video datastream. Alternatively or additionally, the decimation filter 101 may remove samples of the video data over time to temporally decimate the video datastream. The decimation filter 101, therefore, provides a first level of video compression.

From there, the codec 102 compresses the video datastream even further using any of a number of known video compression techniques, such as MPEG. The decimation filter 101 and the codec 102 may be implemented on a digital signal processor (DSP) or via a general-purpose processor operable to process the datastream using the decimation filtering and codec signal processing techniques.

The filtered/compressed video datastream from the codec 102 is transferred to the video reconstruction comparator 103. The video reconstruction comparator 103 retains a copy of the filtered/compressed video datastream and reconstructs that datastream based on the types of decimation filtering of the decimation filter 101 and the video compression of the codec 102. The reconstructed video datastream is then compared to the original video datastream by the video reconstruction comparator 103 so as to determine differences between the two video datastreams.

For example, reconstruction of the video datastream after decimation filtering and video compression generally results in errors from the original video datastream. Accordingly, the video reconstruction comparator 103 also receives a copy of the original video datastream to compare the original video datastream to the reconstructed video datastream to determine the differences, or errors in the reconstruction. This results in a difference video datastream which is transferred to a generator 104.

The generator 104 encodes the differences into an error datastream that can be used as a "decompression tool" to enhance subsequent reconstruction of the filtered/compressed video datastream. For example, the decompression tool may represent pixel variations between the original video datastream and the reconstructed video datastream that may be used at a receiving end to adjust pixels in the reconstructed video datastream once it is decompressed. The error data of the decompression tool generally describes small variations between original pixels and reconstructed pixels. Accordingly, the amount of data transferred via the decompression tool is likely to be much less than the original uncompressed video datastream.

The decompression tool may also include information pertaining to how the original video datastream was compressed (e.g., by the decimation filter 101 and/or the codec 102). For example, if the original video datastream has an uncompressed bandwidth of "X", and the decimation filter 101 applies a spatial decimation, then the decimation filter 101 provides a reduction of bandwidth of the original video datastream by a factor of "A" when compared to the original uncompressed video. Then, if the decimation filter 101 applies a temporal decimation, then the decimation filter 101 provides a further reduction of the bandwidth of the original video datastream by a factor of "B" when compared to the original uncompressed video. These decimation factors can be included in the decompression tool as tags to alert the receiving end as to what type of spatial and temporal reconstruction is to be performed. The decompression tool may also include the type of compression algorithm (e.g., H.265) used by the codec 102. Thus, when being reconstructed at the receiving end, the appropriate reconstruction algorithm can be quickly selected.

The decompression tool is then transferred to the combiner 105 such that it may be combined with the filtered/compressed video datastream. For example, an error datastream may be multiplexed with the filtered/compressed video datastream. Then, when/where the filtered/compressed video datastream is to be reconstructed, the error datastream can be de-multiplexed out of the filtered/compressed video datastream to assist in reconstructing the video datastream more closely to its original form.

As used herein, the video reconstruction comparator 103 is any system, device, software, or combination thereof operable to generate a difference video datastream by comparing an original video datastream to a processed version of the video datastream. The generator 104 is any system, device, software, or combination thereof operable to encode the difference video datastream and generate a decompression tool. And, the combiner 105 is any system, device, software, or combination thereof operable to combine the decompression tool with the processed version of the video datastream for subsequent reconstruction.

Figure 2:
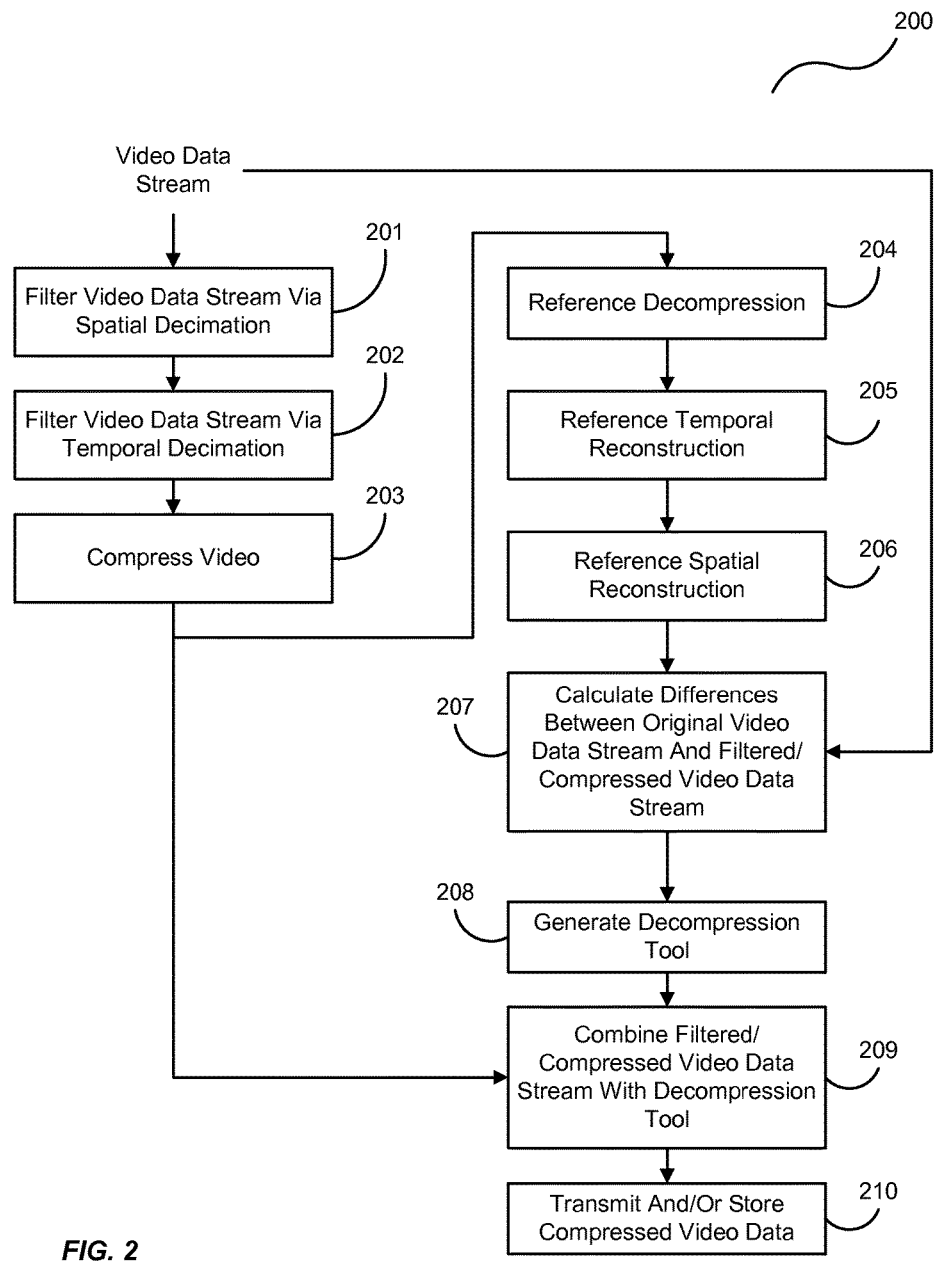
FIG. 2 is a flowchart of an exemplary process of the video compression system of FIG. 1.

FIG. 2 is a flowchart of an exemplary process 200 of the video compression system 100 of FIG. 1. The process 200 initiates when the video datastream is filtered via spatial decimation, in the process element 201. For example, the decimation filter 101 may initially reduce the bandwidth of the video datastream through interlacing, where half of the lines from any picture in the video datastream are transmitted and alternating lines (odd and even) are sent in subsequent pictures. Again, however, other forms of spatial decimation may be employed. Then, the decimation filter 101 may perform a temporal decimation of the video datastream, in the process element 202 (e.g., by not sending all time samples of all picture elements).

After the video datastream is filtered by the decimation filter 101 to reduce the bandwidth, the filtered video datastream is further compressed by the codec 102 using any of a variety of video compression algorithms, such as H.265. From there, the video reconstruction comparator 103 performs a reference decompression on the filtered/compressed video datastream, in the process element 204. For example, since the video reconstruction comparator 103 knows the form of compression used by the codec 102, the video reconstruction comparator 103 can simply decompress the video datastream therefrom. Then, the video reconstruction comparator 103 performs a temporal reconstruction of the decompressed video datastream, in the process element 205, and a spatial reconstruction of the compressed video datastream, in the process element 206. Again, since the video reconstruction comparator 103 knows the factors by which the decimation filter 101 spatially and/or temporally decimates the video datastream, the video reconstruction comparator 103 can interpolate the decompressed video (or other more sophisticated methods of reconstruction) based on those factors to produce a reconstructed video datastream.

In the process element 207, the video reconstruction comparator 103 compares the reconstructed video stream to the original video datastream to calculate differences between two datastreams. For example, as any decompression and/or video interpolation after filtering introduces errors, these errors can be captured by the video reconstruction comparator 103. From there, the generator 104 generates the decompression tool, in the process element 208, by encoding those errors, any decimation filter factors, and/or any codec compression factors such that they may be included in the filtered/compressed datastream for subsequent use in decompression. In this regard, the combiner 105 combines the filtered/compressed video datastream with the decompression tool, in the process element 209, and transmits and/or stores the compressed video data, in the process element 210.

Figure 3:
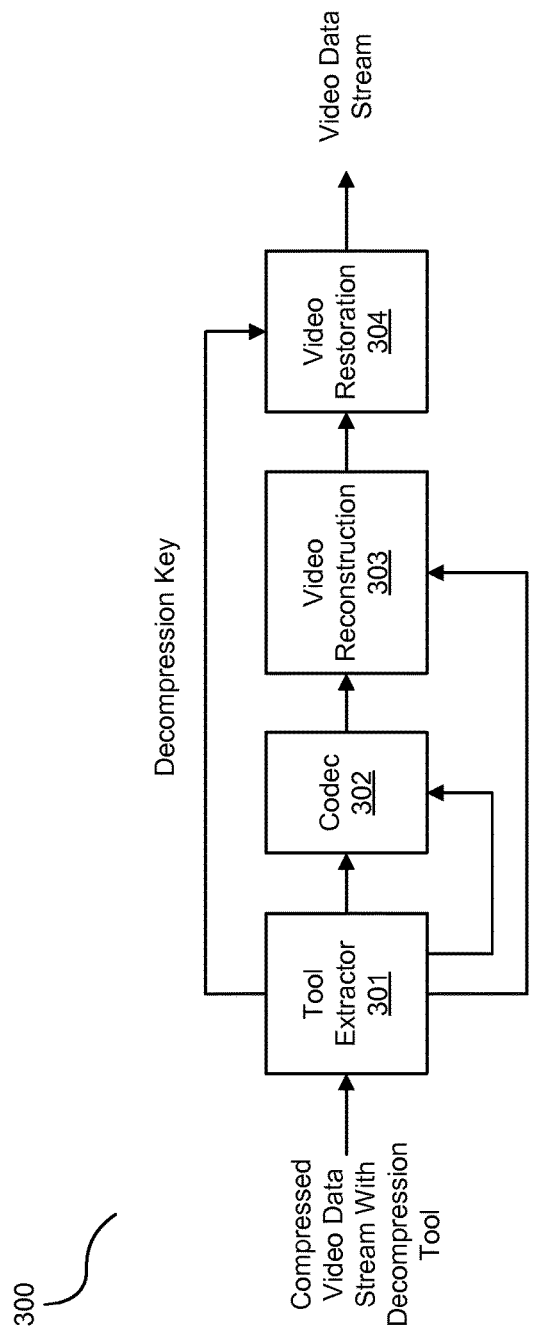
FIG. 3 is a block diagram of an exemplary video decompression system.

As the video compression system 100 reduces video transmission bandwidth and/or storage footprint, the video compression system 100 requires a corresponding decompression system for subsequent decompression of the filtered/compressed video datastream. FIG. 3 illustrates one such video decompression system 300 in an exemplary embodiment of the invention.

In this embodiment, the video decompression system 300 includes a tool extractor 301 that is operable to retrieve the decompression tool from the filtered/compressed video datastream. For example, the decompression tool may be multiplexed as data within the video datastream. Accordingly, the tool extractor 301 may be a demultiplexer that removes the decompression tool from the filtered/compressed video datastream.

The tool extractor 301 transfers the filtered/compressed video datastream to the codec 302 such that the codec 302 can decompress the video datastream as it was compressed in the video compression system 100. In this regard, the tool extractor 301 may also transfer an indicator to the codec 302 as to how the video datastream was originally compressed (e.g., via H.265).

Once decompressed, the codec 302 transfers the video datastream in its remaining decimation filtered form to the video reconstruction module 303. The video reconstruction module 303 reconstructs the video datastream according to the way it was originally decimation filtered. For example, if the decimation filter 101 of FIG. 1 only performs a temporal decimation of the video datastream, then the video reconstruction module 303 would perform an inverse of that temporal decimation to reconstruct the video datastream to almost its original form (i.e., with errors). Again, the tool extractor 301 may transfer an indicator to the video reconstruction module 303 to inform the video reconstruction module 303 as to what form of decimation filtering was performed by the decimation filter 101 in the video compression system 100 of FIG. 1.

Once the video datastream is reconstructed by the video reconstruction module 303, the video restoration module 304 attempts to restore the video datastream to its original form using the decompression tool extracts by the tool extractor 301. In this regard, the video restoration module 304 may adjust resolution, pixel values, etc. based on the errors provided by the decompression tool.

It should be noted that, while the tool extractor 301 may transfer indicators to the video reconstruction module 303 and the codec 302 to inform those modules as to how the original video datastream was decimation filtered and compressed, the invention is not intended be limited to such. In some embodiments, the decompression tool generated by the generator 104 of the video compression system 100 may simply encode the errors associated with the compression filtering and transfer those errors with the filtered/compressed video datastream under the assumption that the receiving end of such has a priori knowledge of the types of decimation filtering and video compression performed by the decimation filter 101 and the codec 102.

Figure 4:
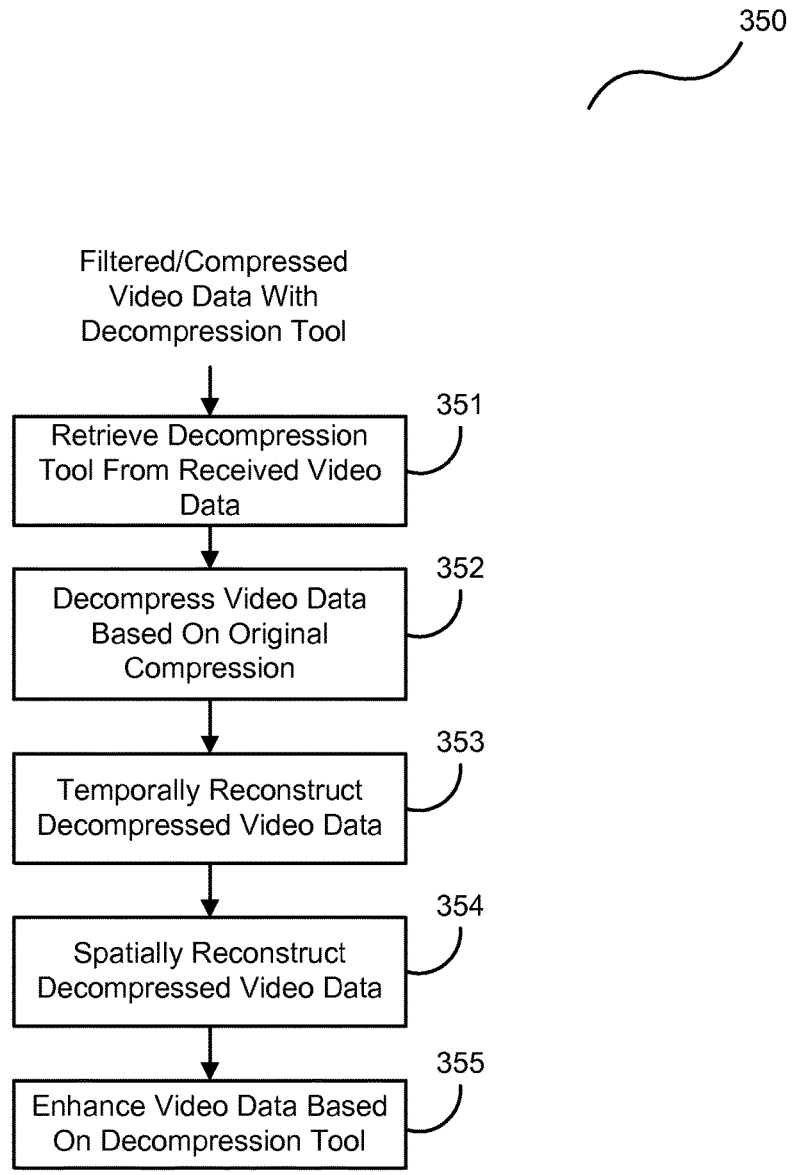
FIG. 4 is a flowchart of an exemplary process the video decompression system of FIG. 3.

FIG. 4 is a flowchart of an exemplary process 350 of the video decompression system 300 of FIG. 3. In this embodiment, the tool extractor 301 retrieves the decompression tool from the received video data, in the process element 301. From there, the codec 302 decompresses the video data based on the original compression by the codec 102, in the process element 302. The video reconstruction module 303 temporally reconstructs the decompressed video data, in the process element 353, again according to the manner in which it was temporally decimated by the decimation filter 101. In the process element 354, the video reconstruction module 303 spatially interpolates the decompressed data based on the manner in which it was spatially decimated by the decimation filter 101. From there, the video restoration module 304 enhances the decompressed interpolated video data based on the error information provided by the decompression tool, in the process element 355.

It should be noted that the processes 200 and 350 are exemplarily illustrated in a particular order but they are not intended to limit the invention to the exact manner in which the process elements are performed. For example, spatial filtering of process element 201 could be performed after the temporal decimation of process element 202. Generally, however, the order in which the decimation filtering occurs should correspond to an inverse order of the reconstruction based on that decimation filtering.

Figure 5:
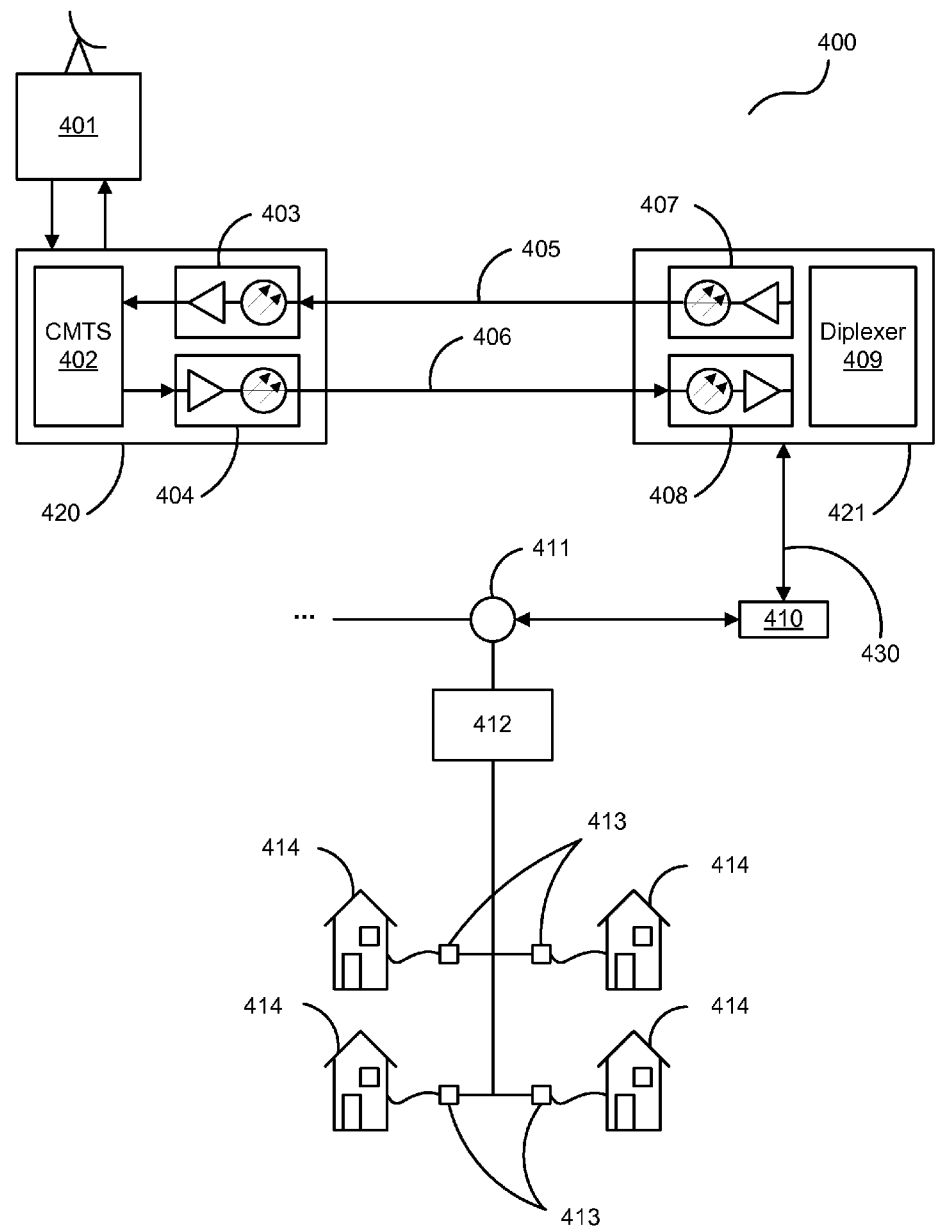
FIG. 5 is a block diagram of one exemplary communication system employing the video compression and decompression systems of FIGS. 1 and 3.

FIG. 5 is a block diagram of one exemplary communication system 400 employing the video compression/decompression concepts described herein. For example, the video compression/decompression concepts disclosed herein may be implemented in a cable television communication system that employs RF signaling techniques across a substantial amount of RF spectrum. An upstream link of the cable television communication system, in this embodiment, provides high speed data services being delivered over devices conforming to the Data Over Cable Service Interface Specification (DOCSIS) specification. The communication system 400 includes a headend 401 configured with an upstream hub 420. The hub 420 is coupled to a downstream node 421 via optical communication links 405 and 406.

The hub 420 includes a Cable Modem Termination System (CMTS) 402, an electrical to optical converter 403, and an optical to electrical converter 404. The node 421 is similarly configured with an optical to electrical converter 408 and an electrical to optical converter 407. The headend 401 is generally the source for various television signals. Antennas may receive television signals that are converted as necessary and transmitted over fiber optic cables 405 to the hub 420. Several hubs may be connected to a single headend 401 and the hub 420 may be connected to several nodes 421 by fiber optic cable links 405 and 406. The CMTS 402 may be configured in the headend 401 or in the hub 420. The fiber optic links 405 and 406 are typically driven by laser diodes, such as Fabry Perot and distributed feedback laser diodes.

Downstream, in homes/businesses are devices called the Cable Modems (CM; not shown). A CM acts as a host for an Internet Protocol (IP) device such as personal computer. Transmissions from the CMTS 402 to the CM are carried over the downstream portion of the cable television communication system generally from 54 to 860 MHz. Downstream digital transmissions are continuous and are typically monitored by many CMs. Upstream transmissions from the CMs to the CMTS 402 are typically carried in the 5-42 MHz frequency band, the upstream bandwidth being shared by the CMs that are on-line. However, with greater demands for data, additional frequency bands and bandwidths are continuously being considered and tested, including those frequency bands used in the downstream paths.

The CMTS 402 connects the local CM network to the Internet backbone. The CMTS 402 connects to the downstream path through the electrical to optical converter 404 that is connected to the fiber optic cable 406, which in turn, is connected to the optical to electrical converter 408 at the node 421. The signal is transmitted to a diplexer 409 that combines the upstream and downstream signals onto a single cable. The diplexer 409 allows the different frequency bands to be combined onto the same cable. The downstream channel width in the United States is generally 6 megahertz with the downstream signals being transmitted in the 54 to 860 MHz band. Upstream signals are presently transmitted between 5 and 42 MHz, but again other larger bands are being considered to provide increased capacity. So, the variably assigned bit resolution concepts herein may be particularly advantageous. However, the invention is not intended to be limited to any particular form of communication system.

After the downstream signal leaves the node 421, the signal is typically carried by a coaxial cable 430. At various stages, a power inserter 410 may be used to power the coaxial line equipment, such as amplifiers or other equipment. The signal may be split with a splitter 411 to branch the signal. Further, at various locations, bi-directional amplifiers 412 may boost and even split the signal. Taps 413 along branches provide connections to subscriber's homes 414 and businesses.

Upstream transmissions from subscribers to the hub 420/headend 401 occur by passing through the same coaxial cable 430 as the downstream signals, in the opposite direction on a different frequency band. The upstream signals are sent typically utilizing Quadrature Amplitude Modulation (QAM) with forward error correction. The upstream signals can employ any level of QAM, including 8 QAM, 32 QAM, 64 QAM, 128 QAM, and 256 QAM. Modulation techniques such as Synchronous Code Division Multiple Access (S-CDMA) and Orthogonal Frequency Division Multiple Access (OFDMA) can also be used. Of course, any type of modulation technique can be used, as desired.

Transmissions, in this embodiment, are typically sent in a frequency/time division multiplexing access (FDMA/TDMA) scheme, as specified in the DOCSIS standards. The diplexer 409 splits the lower frequency signals from the higher frequency signals so that the lower frequency, upstream signals can be applied to the electrical to optical converter 407 in the upstream path. The electrical to optical converter 407 converts the upstream electrical signals to light waves which are sent through fiber optic cable 405 and received by optical to electrical converter 403 in the node 420.

Those skilled in the art should readily recognize that the invention is not intended to be limited to the examples disclosed herein. For example, the invention should not be limited to any particular number of frequency bands segmented, any number of bits of resolution during quantization, and/or any frequency bandwidth of an analog signal. Nor should the invention be limited to any particular form of analog signal. That is, the inventive concepts disclosed herein may be used in a variety of communication systems regardless of bandwidth considerations.

Since the video to be compressed is generally provided by the hub 420 to a consumer, one example of where the video compression system 100 of FIG. 1 could be implemented in a communication system 400 would be with the CMTS 402. For example, cable television consumers typically receive video from the hub 420. However, cable television networks also have certain constraints because they implement RF signaling techniques through cable. And, with the ever increasing demand for higher speed Internet from cable television networks, those constraints are magnified.

By reducing the bandwidth of many of the video signals transferred to the consumer from the communication hub 420, the constraints on the cable television networks can be alleviated to some degree. Accordingly, the communication system 400 may implement the video compression system 100 of FIG. 1 in the CMTS 402 as it is where the RF video signals are first received and prepared for transmission to the consumer (e.g., via the optical communication link 405 to the node 421).

Once received at the node 421, the video decompression system 300 of FIG. 3 may decompress the video datastreams to propagate them over RF to the various subscriber homes and businesses 440. Alternatively or additionally, the video decompression system 300 may be implemented at individual cable boxes of the subscriber homes and businesses 414 allowing the node 421 to incur bandwidth savings that may be used for other forms of communication.

Figure 6:
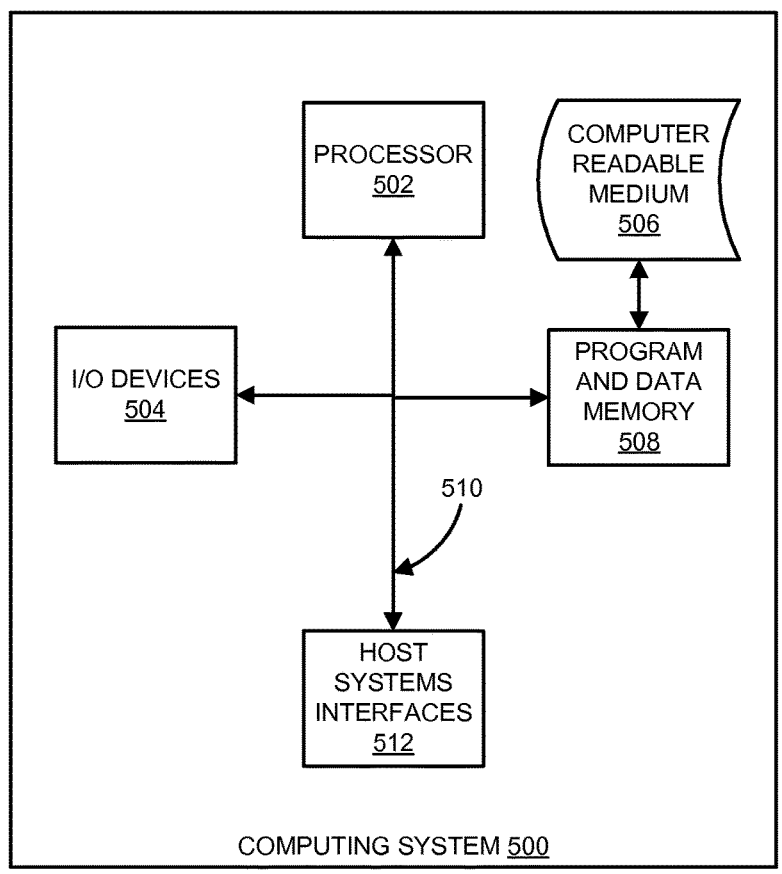
FIG. 6 is a block diagram of an exemplary computing system in which a computer readable medium provides instructions for performing methods herein.

Additionally, the invention can take the form of an entirely hardware embodiment, an entirely software embodiment or an embodiment containing both hardware and software elements. In one embodiment, the invention is implemented in software, which includes but is not limited to firmware, resident software, microcode, etc. FIG. 6 illustrates a computing system 500 in which a computer readable medium 506 may provide instructions for performing any of the methods disclosed herein.

Furthermore, the invention can take the form of a computer program product accessible from the computer readable medium 506 providing program code for use by or in connection with a computer or any instruction execution system. For the purposes of this description, the computer readable medium 506 can be any apparatus that can tangibly store the program for use by or in connection with the instruction execution system, apparatus, or device, including the computer system 500.

The medium 506 can be any tangible electronic, magnetic, optical, electromagnetic, infrared, or semiconductor system (or apparatus or device). Examples of a computer readable medium 506 include a semiconductor or solid state memory, magnetic tape, a removable computer diskette, a random access memory (RAM), a read-only memory (ROM), a rigid magnetic disk and an optical disk. Some examples of optical disks include compact disk-read only memory (CD-ROM), compact disk-read/write (CD-R/W) and DVD.

The computing system 500, suitable for storing and/or executing program code, can include one or more processors 502 coupled directly or indirectly to memory 508 through a system bus 510. The memory 508 can include local memory employed during actual execution of the program code, bulk storage, and cache memories which provide temporary storage of at least some program code in order to reduce the number of times code is retrieved from bulk storage during execution. Input/output or I/O devices 504 (including but not limited to keyboards, displays, pointing devices, etc.) can be coupled to the system either directly or through intervening I/O controllers. Network adapters may also be coupled to the system to enable the computing system 500 to become coupled to other data processing systems, such as through host systems interfaces 512, or remote printers or storage devices through intervening private or public networks. Modems, cable modem and Ethernet cards are just a few of the currently available types of network adapters.

What is claimed is:

1. A video compression system, comprising:
a decimation filter operable to receive a video datastream, and to filter the video datastream to remove spatial data components and temporal data components of the video datastream;
a video codec operable to compress the filtered video datastream;
a comparator operable to first reconstruct the video datastream based on the filtering and the compression, to compare the video datastream to the first reconstructed video datastream on a frame-by-frame basis, wherein one frame of the first reconstructed video datastream is compared to a same frame of the video datastream, and to determine a difference video datastream based on the comparison;
a generator operable to generate data based on the difference video datastream, wherein the data comprises pixel variation errors between the video datastream and the first reconstructed video datastream; and
a combiner operable to combine the filtered-compressed video datastream with the data for second reconstruction of the video datastream by a receiver.

2. The video compression system of claim 1, wherein:
the video codec comprises an MPEG compression module.

3. The video compression system of claim 1, wherein:
the generator is further operable to incorporate a spatial decimation factor within the data for use in the second reconstruction of the video datastream by the receiver.

4. The video compression system of claim 1, wherein:
the generator is further operable to incorporate a temporal decimation factor within the data for use in the second reconstruction of the video datastream.

5. A method of compressing video data, comprising:
filtering a video datastream to remove spatial data components and temporal data components of the video datastream;
compressing the filtered video datastream;
first reconstructing the video datastream based on the filtering and the compression;
comparing the video datastream to the first reconstructed video datastream on a frame-by-frame basis to determine a difference video datastream, wherein one frame of the first reconstructed video datastream is compared to a same frame of the video datastream;

generating data based on the difference video datastream, wherein the data comprises pixel variation errors between the video datastream and the first reconstructed video datastream; and combining the filtered-compressed video datastream with the data for second reconstruction of the video datastream by a receiver.

6. The method of claim 1, wherein compressing the filtered video datastream comprises:

compressing the filtered video data stream with an MPEG compression module.

7. The method of claim 1, wherein generating data comprises:

incorporating a spatial decimation factor within the data for use in the second reconstruction of the video datastream.

8. The method of claim 1, wherein generating data comprises:

incorporating a temporal decimation factor within the data for use in the second reconstruction of the video datastream.

9. A communication system, comprising:

a transmitter, a receiver, and a communication link between the transmitter and the receiver, wherein the transmitter comprises:

a decimation filter operable to receive a video datastream, and to filter the video datastream to remove spatial data components and temporal data components of the video datastream;

a video codec operable to compress the filtered video datastream;

a comparator operable to first reconstruct the video datastream based on the filtering and the compression, to compare the video datastream to the first reconstructed video datastream on a frame-by-frame basis, wherein one frame of the first reconstructed video datastream is compared to a same frame of the video datastream, and to determine a difference video datastream based on the comparison;

a generator operable to generate data based on the difference video datastream, wherein the data comprises pixel variation errors between the video datastream and the first reconstructed video datastream; and a combiner operable to combine the filtered-compressed video datastream with the data for second reconstruction of the video datastream by the receiver, wherein the receiver comprises:

an extractor operable to extract the data from the filtered-compressed video datastream;

a codec operable to decompress the filtered-compressed video datastream a video reconstruction module communicatively coupled to the codec and to the extractor to second reconstruct the decompressed video data stream based on parameters of the decimation filter included in the data; and a video restoration module communicatively coupled to the video reconstruction module and to the extractor to correct errors in the second reconstructed video data stream based on the pixel variation errors configured in the data.

10. The communication system of claim 1, wherein:

the communication link is a coaxial cable conveying the filtered-compressed video datastream to the receiver over radio frequency (RF).

* * * * *